Patented Dec. 10, 1940

2,224,167

UNITED STATES PATENT OFFICE 2,224,167

METHOD OF PREPARING GELATIN PRODUCT

William E. Stokes, Brooklyn, and Margaret H. Kennedy, New York, N. Y., assignors to Standard Brands Incorporated, New York, N. Y., a corporation of Delaware No Drawing. Application December 9, 1937, Serial No. 178,906

10 Claims. (Cl. 99—130)

This invention relates to a method of preparing a relatively stable gelatin food product and has for a general object the provision of an effective and practicable procedure whereby relatively non-drying flavor improvers of a certain type may be readily incorporated in the gelatin food product to enhance the keeping qualities and flavor retentive characteristics thereof without preventing the obtainment of sensibly dry, relatively non-hygroscopic, free-flowing granular gelatin product.

A further object of the invention is the provision of a method which permits efficient incorporation in commercial gelatin food products of a flavor improver that prior to the present invention could not be incorporated with satisfactory results and the use of flavoring substances in the commercial preparation of gelatin, which heretofore were considered unsuitable.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

The preparation of gelatin food products in a substantially granular free-flowing condition with an added sweetening agent and/or flavoring material, edible acid, etc., is widely practiced and in a variety of ways. As previously prepared, many such products possess characteristics making their preparation for consumption difficult, have poor keeping qualities particularly in that they are hygroscopic and retain rather poorly included delicate and volatile aromatic and flavoring principles, are non-uniform in composition and limited in the amount and nature of flavoring and additive ingredients that may be utilized. Many flavoring materials, such as liquid flavors, for example fruit juices and flavor concentrates, when reduced to a dry state retain only a small part of the flavoring principles with a resultant change in the characteristic odor and taste. When admixed with gelatin the food product is non-uniform in character and of poor keeping qualities. Further when masses of granular gelatin are added to a solution of flavoring material or additive ingredient, there is a tendency for the gelatin particles to adhere and form balls or lumps. This results in an unequal distribution of the flavoring material or ingredient due to a low degree of penetration into the lumps of gelatin, and also necessitates breaking up the lumps in order to form a free-flowing, granular food product.

Some proposed methods of forming a granular product, such as spray-drying, are costly and may endanger the delicate and highly volatile aromatic and flavoring principles. Mixing flavoring material into a solution of gelatin before the latter has gelatinized as heretofore attempted, despite painstaking precautions, usually resulted either in a discolored unsightly mass, an undesirable taste and odor and/or the production of a soft, gummy product unsuitable for commercial use. This prevented the incorporation of certain substances that might otherwise have been desirable for their own flavoring characteristics, or their abilities to improve certain features of texture and/or aid in the retentivity of delicate aromatic and flavoring principles, or improve that feature of the gelatin.

In accordance with the present invention relatively stable, sensibly dry, relatively non-hygroscopic, free-flowing, granular gelatin food products substantially free from the above-noted and other undesirable characteristics can be prepared by a method which overcomes the difficulties of the prior procedures.

The invention contemplates the incorporation of a "flavor improver" in a gelatin food product. That term as used herein is intended to identify substances which may contribute a distinctive flavor and improve the texture of the gelatin food product, or may be added to the gelatin along with flavoring materials such as fruit and vegetable flavors, e. g., juices, extracts or flavor concentrates of fruits or vegetables, or may constitute an ingredient of the flavoring material. When such substance is an ingredient of the flavoring material this is to be considered a "flavor improver."

Flavor improvers used in the practice of the invention are further characterized in that they will normally tend to prevent obtainment of a sensibly dry, free-flowing product when incorporated with gelatin and/or are relatively non-drying in and of themselves.

Further, when used in conjunction with a flavoring material containing highly volatile and delicate aromatic and flavoring principles they appear to have a rather close affinity for or association with the latter forming perhaps a relatively stable aggregate therewith tending to prevent escape of such principles until effectively entrapped by the gelatin and sealed within bodies thereof.

By way of example the class of such flavor improvers includes the substances levulose (d-fructose), glucose, maltose, invert sugar, glycerol, a non-toxic glycol such as propylene glycol; and extracts, fruit and vegetable flavors, etc., containing one or more of such substances, or ingredients which by chemical change that may occur during or after the preparation of the gelatin may be converted thereinto. An example of the latter is fruit juice and cane sugar (saccharose) which it may be desired to add to gelatin. Acidity, e. g. that of the fruit juice, may cause inversion of the cane sugar to glucose and fruit sugar (d-fructose or levulose). The levulose-dextrose syrup product disclosed in the United States patent to Gore et al., No. 2,069,064, issued January 26, 1937, is an example of a flavor improver that may be used. A composition comprising invert sugar to which cane sugar has been added to prevent crystallization of dextrose, may also be used.

Incorporation of glycerol or a non-toxic glycol may be desired in that glycerol and propylene glycol, for example, are both solvents for flavoring and aromatic principles and other components of fruits and vegetables, and may advantageously be used as extracting menstruums in the preparation of fruit or vegetable flavors, extracts or concentrates. The present invention permits the use of such fruit or vegetable flavors in the preparation of a gelatin product.

Previously due to difficulty in obtaining a sensibly dry, free-flowing fruit-flavored gelatin product it was found to be necessary to use cold-packed or dried fruits, extract the flavor from the pulp thereof and concentrate the extract. Such procedures frequently resulted in change and loss of flavor. Further such concentrated extracts require the addition of a relatively large amount of alcohol, e. g. 20%, to prevent fermentation, a serious item of expense, or the addition of other preservatives which are undesirable. The present method avoids the necessity of using such fruit flavoring materials in that it permits the use of sugar packed fruit, i. e. fresh fruit to which cane sugar has been added usually in the proportion of about two parts to one. Effective incorporation of invert sugar (d-glucose and d-fructose) may be accomplished and no difficulty is encountered because of inversion of the cane sugar due to the acidity of the fruit.

A suitable oxidation inhibitor, such as those disclosed in the application of Johnston, Stokes, Kennedy and Frey, for Flavoring materials and method of Preservation, Serial No. 182,494, filed December 20, 1937, may be incorporated in the gelatin in conjunction with flavoring materials, especially flavors containing essential oils, such as those, for example, disclosed in the Stokes and Wenneis Patent No. 2,088,662 issued August 3, 1937.

The additive ingredients and/or substances including flavor improver may be admixed with a solution of gelatin, preferably at a temperature just above that at which the gelatin solution will begin to gelatinize, cooling to gelatinize the mixture, drying the latter and granulating.

There is a relationship of the solids of the additive ingredients to the gelatin. The gelatin is preferably in excess of the other solids in the mixture.

In addition there is a definite control of the acidity of the mixture to a pH value of about 3.5 to 4.7. It has been found that when the pH is more than 4.7, the iso-electric point of gelatin, the resulting product usually is discolored and unsightly, and there is a tendency for the development of bad taste and odor. When the pH is less than 3.5 the product tends to be soft and gummy. Adjustment or control of the pH may be accomplished or insured in a number of ways. If alkaline or bone gelatin, usually having a pH of about 5 to 6 is used, the pH of the solution of gelatin may properly be adjusted by the addition of an acid which is harmless in the amounts used, e. g. a weak organic acid such as citric, tartaric, malic, or acid salts thereof. When fruit flavors such as fruit juice, or the like, are to be added the normal acidity thereof may be relied upon if sufficient properly to adjust the acidity of the mixture, or augmented by a suitable acid substance if not. If acid gelatin, ordinarily having a pH of between about 4 and 4.5, is used proper pH control may be had by suitable adjustment, when needed, of the additive ingredients such as fruit juice flavor. As an alternative, the additive ingredients may first be mixed with the solution of gelatin and the pH of the mixture then adjusted.

In the preparation of the gelatin solution the proportion of gelatin to water may vary widely, sufficient gelatin being used to set the solution. It has been found that about 10 grams of gelatin will set 500 cc. of solution, i. e. about a 2% solution. A 10% gelatin solution has been used in the practice of the invention. The solution may be prepared by dissolving gelatin in the proper amount of hot water and then cooling to a temperature just above that at which gelatinization will begin. This, of course, varies with the type of gelatin and concentration of solution used but may be, for example, in the neighborhood of about 125° F., a temperature at which delicate, volatile, aromatic and flavoring principles of flavoring materials such as fruit flavors are not materially affected or liberated.

The additive ingredients, e. g. fruit flavors such as that derived from sugar packed fruit and, if desired, an added amount of levulose, or invert sugar, or other like flavor improver, are added to the cool gelatin solution, the mixture gelatinized or set by further cooling, and then subdivided and dried in any suitable manner as tunnel drying, wheel drying, or belt drying. For example, the mixture may be cooled to a temperature of about 90° F. by passing it through cooling coils and then flowed upon a belt moving through a cooling room in which a current of cold air flows counter to the direction of belt travel. The mixture sets in a layer upon the belt and as it comes from the cooling room may be cut into strips, placed on racks or netting and dried over a period of hours, e. g. twenty-four, in an air conditioned room at a temperature at which the flavoring principles will not undergo substantial deterioration. The dried gelatin mixture is granulated suitably such as by grinding, and then bolted.

As illustrative of a manner in which the invention may be carried out, the following example is given:

300 lbs. of gelatin were dissolved in hot water and the solution cooled to about 135° F., a temperature slightly above that at which the gelatin solution begins to gelatinize. The gelatin solution had a pH of 4.5. To this gelatin solution was added 30 lbs. of levulose-dextrose syrup of the type disclosed in the above identified Gore et al. patent, and 72 liters of concentrated strawberry juice containing about 10 lbs. of solids and having a pH of 3.74. After thorough mixing the mixture was set to a firm jelly, cut into strips, the strips dried on netting and then ground to obtain a granular, sensibly dry, free-flowing product. The finished product had a pH of 4.32.

Much greater amounts of levulose-dextrose syrup have been thus successfully incorporated in gelatin with no difficulty encountered in obtaining a sensibly dry, free-flowing, granular product, e. g. 20 g. syrup and 20 cc. strawberry extract in a solution of 424 g. water and 45.4 g. gelatin, with a control of the pH of the mixture between 3.5 and 4.7. However, the amounts set forth in the above example are preferred since they are believed to be more adapted to ready mixing in large amounts comparable to ordinary factory procedure.

It has been found that if fruit juice flavor containing an appreciable amount of invert sugar or levulose is thoroughly mixed with dry granular gelatin and the mixture dried by heat or a current of air the resulting product is hygroscopic.

The present procedure not only permits the use of flavor improvers and types of fruit flavors which heretofore could not be used satisfactorily, but in addition allows efficient preparation of a gelatin product which successfully seals the flavors within the gelatin and prevents any substantial escape of flavoring and aromatic principles prior to the sealing of the latter within the gelatin. Further the procedure facilitates effective incorporation of the additive ingredients due to large surface area and the ease with which the flavor improvers enter into solution. A relatively stable, sensibly dry, relatively non-hygroscopic, free-flowing, granular gelatin food product of unusual type can thus be obtained in a simple and ready manner.

The "gelatin food product" described and referred to herein is not to be confused with the products commonly known in the trade as "gelatin desserts," e. g. dry powders which may be converted to delectable desserts by forming solutions therefrom and setting to form jelly-like comestibles, such as by dissolving the dry powders in hot water and cooling the resulting solutions to obtain gelled desserts. Such "gelatin desserts" may comprise gelatin, sugar, acid and a suitable flavor constituent as is well known in the art, and it is to be understood that the present gelatin food product is suitable for use as the flavor constituent of such gelatin dessert.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described.

Having described my invention, what I claim as new and desire to secure by Letters Patent is:

1. A method of preparing a gelatin product which includes a flavor improver comprising a substance selected from the group consisting of levulose, glucose, maltose, invert sugar, glycerol and an edible glycol, comprising mixing with a solution of gelatin the other ingredients of the product, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

2. A method of preparing a gelatin product which includes a fruit flavor and a substance selected from the group consisting of levulose, glucose, maltose, invert sugar, glycerol and an edible glycol, comprising mixing with a solution of gelatin the other ingredients of the product, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

3. A method of preparing a gelatin product which comprises mixing a fruit flavoring substance obtained from sugar packed fruit which includes invert sugar, with a solution of gelatin, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

4. A method of preparing a gelatin product which includes a fruit flavoring substance obtained from sugar packed fruit and a substance selected from the group consisting of levulose, glucose, maltose, invert sugar, glycerol and an edible glycol, comprising mixing with a solution of gelatin the other ingredients of the product, in an amount whereby the gelatin solids are in excess of the other solids present in the mixture, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

5. A method of preparing a gelatin product which includes a flavor improver comprising levulose, comprising mixing with a solution of gelatin the other ingredients of the product, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

6. A method of preparing a gelatin product which includes a flavor improver comprising invert sugar, comprising mixing with a solution of gelatin the other ingredients of the product, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

7. A method of preparing a gelatin product which comprises adding to water an amount of gelatin sufficient to set resulting gelatin solution, dissolving the gelatin in the water with the use of heat, cooling the gelatin solution to a temperature just above that at which gelatinization begins, adding to the cooled gelatin solution a flavor of fruit and vegetable origin and a substance selected from the group consisting of levulose, glucose, maltose, invert sugar, glycerol and an edible glycol, in an amount whereby the gelatin solids are in excess of the other solids present in the resulting mixture, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

8. A method of preparing a gelatin product which comprises adding to water an amount of gelatin sufficient to set resulting gelatin solution, dissolving the gelatin in the water with the use of heat, cooling the gelatin solution to a temperature just above that at which gelatinization begins, adding to the cooled gelatin solution a fruit flavor and levulose in an amount whereby the gelatin solids are in excess of the other solids present in the resulting mixture, adjusting the pH of the resulting mixture to between about 3.5 and 4.7, obtaining gelatinization of the mixture, drying the gelatinized mixture, and granulating, whereby is obtained a sensibly dry, relatively stable and non-hygroscopic, free-flowing, flavored product.

9. In a method for the preparation of a sensibly dry, friable flavored gelatin product; the steps of forming a solution of the ingredients of the product comprising gelatin and a flavoring substance obtained from sugar packed fruit which includes invert sugar, adjusting the pH of the resulting mixture to between about 3.5 and 4.7 obtaining gelatinization of the mixture, drying the gelatinized mixture, and granulating, whereby is obtained a sensibly dry, relatively stable and non-hygroscopic, free-flowing, flavored product.

10. In a method of preparing a friable gelatin product including a flavor improver comprising a substance selected from the group consisting of levulose, glucose, maltose, invert sugar, glycerol and an edible glycol; the steps comprising forming a solution of gelatin and the other ingredients of the product, adjusting the pH of the mixture to between about 3.5 and 4.7 obtaining gelatinization of the mixture, drying the gelatinized mixture, and granulating, whereby is obtained a sensibly dry, relatively stable and non-hygroscopic free-flowing, flavored product.

WILLIAM E. STOKES.
MARGARET H. KENNEDY.